United States Patent Office 3,009,948
Patented Nov. 21, 1961

3,009,948
PRODUCTION OF ACRYLIC COMPOUNDS
Hans Lautenschlager, Ludwigshafen (Rhine), and Herbert Friederich, Worms, Germany, assignors to Badische Anilin- & Soda-Fabrik Aktiengesellschaft, Ludwigshafen (Rhine), Germany
No Drawing. Filed Sept. 13, 1957, Ser. No. 683,698
Claims priority, application Germany Sept. 22, 1956
15 Claims. (Cl. 260—486)

This invention relates to a process for the production of acrylic compounds by the reaction of acetylene, carbon monoxide and compound with reactive hydrogen, whereby this reaction is carried out in acid medium in the presence of nickel carbonyl at low pressure and at temperatures above 70° C.

From the works of W. Reppe it is known that acrylic acid and its functional derivatives—hereinafter referred to as acrylic compounds—can be prepared by reaction of acetylene, a compound with reactive hydrogen and nickel carbonyl or carbon monoxide in the presence of carbonyl-forming metals or their compounds.

Whereas it is now readily possible to prepare acrylic compounds from compounds with reactive hydrogen, acetylene and nickel carbonyl in the presence of an acid at 45° to 60° C., this is only possible under the same conditions but with the simultaneous presence of carbon monoxide only when there has been brought into operation previously a so-called "stoichiometric reaction" of acetylene, nickel carbonyl and a compound with reactive hydrogen in the absence of carbon monoxide.

In the copending application Serial Number 653,280, filed April 17, 1957, now Patent No. 2,886,591, there is described a process according to which by adding organic substances, which form with nickel compounds compounds of a higher series, the production of acrylic compounds is also possible in the presence of carbon monoxide at low pressures, and at the same time it is achieved that the carbon monoxide introduced in gaseous form is substantially reacted.

We have now found that acrylic compounds can be advantageously prepared by reacting acetylene, and a compound with reactive hydrogen in the presence of nickel carbonyl and in acid medium with carbon monoxide at low pressure and at temperatures of 70° to 200° C., especially between 75° and 120° C.

Compounds with reactive hydrogen, such as alcohols, organic amines and water, are especially useful.

By working in this way a great part of the carbon monoxide introduced is reacted so that about 70 to 80 percent of the carbonyl groups in the resultant acrylic compounds originate from the gaseous carbon monoxide.

It is a considerable advantage of the present process that is not necessary, as in the known methods, first to initiate the so-called "stoichiometric reaction" of acetylene, nickel carbonyl and a compound with reactive hydrogen in the absence of carbon monoxide, before a mixture of acetylene and carbon monoxide can be introduced into the reaction vessel. On the contrary, it is possible to begin the reaction immediately in the presence of a gas mixture of acetylene and carbon monoxide such as is necessary for the reaction, by working within the stated temperature range. It is also of advantage that the reaction also does not come to a standstill when the proportion of carbon monoxide is increased considerably above the proportion which is used in the reaction. Thus it is possible to use, depending on the temperature used, gas mixtures which contain about 10 to 80 percent of carbon monoxide and 20 to 90 percent of acetylene. The carrying out of the reaction is thereby simplified and its course exposed to fewer disturbances.

It is possible according to this process to work at normal pressure with good yields and good throughput. Slightly increased pressures, up to about 7 to 10 atmospheres total pressure, may however be used. It is preferable however to work at pressures below the ignition limits of the gas mixture. The process may be carried out continuously or discontinuously. The nickel carbonyl can be introduced into the reaction vessel with the supply of liquid or with the gas stream.

Since the reaction temperature lies above the boiling temperature of nickel carbonyl, it is preferable to cool the waste gas in order to condense the nickel carbonyl therefrom. It is especially advantageous to wash the nickel carbonyl out from the waste gas by leading the latter in countercurrent through a trickling tower which is charged with a solvent or alcohol used in the reaction. In some cases it is sufficient to lead the waste gas through a cooled layer of such a liquid. The condensed or washed-out nickel carbonyl is preferably returned to the reaction.

In the production of acrylic acid esters it is preferable to work by adding alcohol which contains nickel carbonyl to a mixture of an alcohol, preformed acrylic acid ester of the corresponding alcohol, nickel carbonyl and an acid with intensive stirring or circulatory pumping, and leading in at the same time a mixture of carbon monoxide, acetylene and hydrogen chloride.

The reaction may however also be begun with alcohols which do not contain any preformed ester and without previously-introduced nickel carbonyl. As reaction vessels there may be used boilers with stirring means or reaction towers with vigorous liquid circulation or trickling towers. There may also be additionally supplied to the reaction medium indifferent solvents such as methyl ethyl ketone, dioxane, glycol dimethyl ether, toluene, tetrachlorethane, tetrahydrofurane and the like. This is especially to be recommended in the production of acrylamide or acrylic acid.

The acid necessary for the reaction can be supplied in gaseous form as in the case, of hydrogen chloride, or in alcoholic or other solution, as when using hydrogen bromide, or separately as such, as in the case of acrylic acid.

It is preferable to begin the reaction by heating the reaction mixture under a mixed gas atmosphere to 70° to 90° C. The beginning of the reaction is detectable by a rise in temperature and by the occurrence of a dark brown coloration. It is usually necessary to cool from the beginning of the reaction. The coloration often dilutes to an olive-green. In the absence of water the color changes to green. In some cases it is advantageous to add polymerization inhibitors, such as hydroquinone, beta-naphthol, phenothiazine or methylene blue or the like in small quantities.

In the production of acrylic esters by this process there may be used above all saturated monohydric alcohols of the aliphatic series which contain 1 to 18 carbon atoms with primary, secondary or tertiary radicals, as for example methanol, ethanol, propanol, normal-butanol, amyl alcohol, 2-ethyl alcohol, n-dodecyl alcohol, n-octadecyl alcohol, secondary butanol, isopropanol, isobutanol or tertiary butanol. Alicyclic alcohols, such as cyclohexanol or methylcyclohexanol, and unsaturated aliphatic alcohols, such as allyl, methallyl, crotyl or propargyl alcohols, also may be employed however. Polyhydric alcohols, such as ethylene glycol, propylene glycol, n-butanediol-(1.4), glycerine, pentaerythritol or manitol, may also be used, and it is possible for only one or for more than on OH-group to enter into reaction. Finally the alcohols may be substituted in other ways, for example by halogen, ether groups, nitro groups, keto groups and the like.

For the synthesis of acrylamides there may be employed the aliphatic, alicyclic, aromatic and heterocyclic primary and secondary amines, as for example normalbutylamine, 2-ethylhexylamine, aniline, cyclohexylamine, ethylene diamine, ethanolamine, aminopyrimidine, N-methylaniline and the like.

Other compounds with reactive hydrogen which are suitable for the reaction are water, phenols, enols, mercaptans and carboxylic acids.

As acids it is preferable to use hydrogen chloride, acetic acid or acrylic acid. Other organic acids may be used however, such as propionic acid, benzoic acid, oxalic acid, succinic acid and other inorganic acids such as hydrogen bromide, hydrogen iodide or phosphoric acid. It is often advantageous to work with a mixture of two acids. The amount of the acid used should be about 40 to 150 percent, especially 60 to 100 percent, of the weight equivalent to the nickel carbonyl.

The following examples will further illustrate this invention but the invention is not restricted to these examples. The parts specified in the examples are parts by weight unless otherwise specified. When parts by volume are specified these bear the same relation to the parts by weight as the litre does to the gram. By mixed gas there is meant a gas mixture of equal parts by volume of acetylene and carbon monoxide.

*Example 1*

1,380 parts of normal-butanol and 45 parts of nickel carbonyl are placed in a three-necked vessel provided with a stirrer, reflux condenser and gas inlet pipe. After expelling the air by mixed gas, the whole is heated to 85° C. The waste gas is led through a cooled receiver. Then there are led in per hour under normal pressure 40 parts by volume of mixed gas and 3 parts by volume of hydrogen chloride. After 5 minutes, the mixture becomes colored dark brown, the absorption begins and the temperature rapidly rises to 90° C. The internal temperature of the reaction is kept at 85° C. by lowering the bath temperature. Then 70 parts by volume of mixed gas and 5 parts by volume of hydrogen chloride are led in per hour and a mixture of 120 parts of nickel carbonyl and 180 parts of normal-butanol added in the course of 5 hours. The color of the solution remains dark brown throughout the course of the whole experiment. The contents of the cooled receiver are returned hourly to the reaction vessel. After 4 hours the separation of finely divided brown nickel chloride begins. Altogether 234 parts by volume of gas are absorbed. In the cooled receiver there are 26 parts of a colorless substance boiling at −50° C. which contains 97 percent of nickel carbonyl.

By distillation there are recovered 1,912 parts of a solution of 46.8 percent of butyl acrylate in butanol besides 70 parts of a pale brown solid residue.

*Example 2*

The procedure of Example 1 is followed but with the addition of 100 parts of acrylic acid to the reaction mixture and without leading in hydrogen chloride and while leading through 50 parts by volume of mixed gas per hour during the course of the experiment which lasts 5 hours. 1,987 parts of a green solution free from precipitate are obtained. By distillation there are obtained therefrom 1,885 parts of a solution of 34 percent of butyl acrylate in butanol besides 102 parts of a green solid residue. In the cooled receiver there are present 45.5 parts of a colorless substance which is solid at −50° C. and which contains 92 percent of nickel carbonyl.

*Example 3*

The apparatus described in Example 1 is charged with 1,380 parts of 99 percent ethyl alcohol and 45 parts of nickel carbonyl. After expelling the air by mixed gas, the whole is heated to 77° C. while stirring and 60 parts by volume of mixed gas and 5 parts by volume of hydrogen chloride gas are led in per hour at normal pressure. The absorption begins after 8 minutes with a brown coloration of the solution. 120 parts of nickel carbonyl in 180 parts of 99 percent ethyl alcohol are then added in the course of 5 hours. The condensate containing nickel carbonyl collecting in the cooled receiver is returned hourly to the reaction mixture. After 5 hours there are obtained 1,976 parts of a pale brown solution containing a small amount of a brown precipitate. In the cooled receiver there are present 36 parts of a colorless condensate which is solid at −50° C. By distillation there are obtained 1,867 parts of a solution containing 31.2 percent ethyl arcrylate in ethanol besides 109 parts of a pale brown solid residue.

*Example 4*

1,380 parts of cyclohexanol, 45 parts of nickel carbonyl and 2 parts of hydroquinone are introduced into the apparatus described in Example 1. After expelling the air by mixed gas, the mixture is heated while stirring to 90° C. and at the same time 40 parts by volume of mixed gas and 5 parts by volume of hydrogen chloride are led in per hour under normal pressure. After 10 minutes, the mixture assumes a brownish color and begins to absorb gas with a rise in the temperature to 95° C. At this temperature, a mixture of 120 parts of nickel carbonyl and 180 parts of cyclohexanol is added within 5 hours. The contents of the cooled receiver are returned to the reaction mixture hourly. After 5 hours, 1,779 parts of a pale yellow solution containing a fine pale brown precipitate are obtained which contain 32.5 percent of cyclohexyl acrylate. 56 parts of a colorless substance which is solid at −50° C. are contained in the cooled receiver.

*Example 5*

1,380 parts of 2-ethylhexanol, 45 parts of nickel carbonyl and 2 parts of phenothiazine are reacted as described in Example 4 but at a reaction temperature of 105° C. After 5 hours, 1,876 parts of a pale brown solution are obtained which contains a fine brown precipitate. 32 parts of a colorless substance which is solid at −50° C. are present in the cooled receiver. By distillation there are obtained 1,687 parts of a distillate containing 43.7 percent of acrylic acid 2-ethylhexyl ester besides 189 parts of a pale brown solid residue.

*Example 6*

1,630 parts of dioxane, 45 parts of water and 5 parts of methylene blue are placed in the apparatus described in Example 1. After expelling the air by mixed gas, the whole is heated to 85° C. while stirring and then 40 parts by volume of mixed gas and 4 parts by volume of hydrogen chloride are led in hourly at normal pressure. After 10 minutes the absorption begins. Then during 5 hours there is added a mixture of 120 parts of nickel carbonyl and 250 parts of dioxane and, separately therefrom, 100 parts of water. The condensate formed in the cooled receiver is returned hourly to the reaction mixture. After 5 hours there are obtained 22.5 parts of a solution which contains a pale green precipitate and which is separated by distillation into two fractions. The first, fraction amounting to 1,809 parts, boils at 86° to 105° C. at atmospheric pressure and mainly contains dioxane and water. In the second fraction, 355 parts pass over between 36° and 80° C. at a pressure of 18 torr, consisting of acrylic acid to the extent of 75.5 percent. There remain 51 parts of a green solid residue which consists of a mixture of nickel chloride hexahydrate and nickel acrylate. 46 parts of a colorless substance which is solid at −50° C. are present in the cooled receiver.

*Example 7*

524 parts of acrylic acid, 876 parts of methyl ethyl ketone and 16 parts of beta-naphthol are introduced into the apparatus described in Example 1. Then 520 parts of N-methylaniline are slowly added while stirring and cooling. After expelling the air by mixed gas, the whole is heated to 77° C. and 30 parts by volume of mixed gas are introduced per hour under normal pressure. Within 5 hours, 104 parts of nickel carbonyl in 240 parts of methyl ethyl ketone are allowed to drip in. The absorption begins after 8 minutes with a brown coloration which slowly changes to green after about 30 minutes. The contents of the cooled receiver are added hourly to the reaction mixture. After 5 hours, 2,330 parts of solution are obtained in all. There are 25 parts of a colorless substance which is solid at −50° C. in the cooled receiver. The solvent and unreacted N-methylaniline and acrylic acid are distilled off under reduced pressure. There remain 1,007 parts of a brown viscous residue. This is washed three times in a separating funnel each time with 1,000 parts of water, twice each time with 1,000 parts of 5 percent hydrochloric acid and again with 1,000 parts of water. 494 parts of a brown oil are obtained which by vacuum distillation is separated into the following fractions:

(1) 30° to 60° C. 18.0 torr 18 parts, liquid, colorless
(2) 85° to 120° C. 0.5 torr 83 parts, colorless, crystalline
(3) 120° to 160° C. 1.2 torr 151 parts, colorless, crystalline
(4) 160° to 187° C. 1.3 torr 100 parts, yellow oil with colorless crystals
(5) 190° to 215° C. 1.5 torr 51 parts, yellow oil.

8 parts of a brown solid product remain in the residue. There are 75 parts of a colorless liquid in the cooled receiver.

Fractions 2 and 3 are recrystallized from petroleum ether and identified as acrylic acid N-methylanilide by the melting point of 78° C. and elementary analysis. A further 23 parts of acrylic acid N-methylanilide can be obtained from fraction 3 by separation of the crystals from oil. The oils 3, 4 and 5 cannot be caused to crystallize. Elementary analysis shows that they also have the composition of acrylic acid N-methylanilide.

*Example 8*

The apparatus described in Example 1 is charged with 1,380 parts of butanediol-(1.4) and 2 parts of hydroquinone and heated to 90° C. While stirring there are added to this mixture a solution of 297 parts of nickel carbonyl in 585 parts dioxane within 6 hours and at the same time 40 parts by volume of mixed gas and 5 parts by volume of hydrogen chloride are led in per hour at normal pressure. The absorption begins after 10 minutes with a brown coloration of the solution. 2,083 parts of solution which contains a yellow precipitate and 337 parts, i.e. 16.2 percent per weight, of the mono acrylic acid ester of the butanediol-(1.4) are obtained. In the cooled receiver there are gained 218 parts of nickel carbonyl.

1,380 parts of n-dodecyl alcohol, 45 parts of nickel carbonyl and 2 parts of hydroquinone are introduced into the apparatus described in Example 1. After expelling the air by mixed gas the mixture is heated while stirring to 85° C. and at the same time 40 parts by volume of mixed gas and 5 parts by volume of hydrogen chloride are led in per hour under normal pressure. When after 10 minutes the mixture assumes a brownish color and begins to absorb gas, a solution of 120 parts of nickel carbonyl in 180 parts of n-dodecyl alcohol is added within 5 hours. The content of the cooled receiver is recycled hourly into the reaction mixture.

There are obtained 1,702 parts of a light-yellow solution which contains a fine dispersed brownish precipitate. After cooling to room temperature the solution becomes semi-solid. It contains 830.5 parts, that are 48.8 percent per weight, of the acrylic ester of the n-dodecyl alcohol.

*Example 10*

1,380 parts of n-octadecylalcohol and 2 parts of hydroquinone are introduced into the apparatus described in Example 1 and heated to 90° C. While stirring there are added 297 parts of nickel carbonyl dissolved in 576 parts of dioxane within 6 hours. At the same time 40 parts by volume of mixed gas and 5 parts by volume of hydrogen chloride are led per hour. After 10 minutes the mixture assumes a brownish color and begins to absorb gas.

There are obtained 2,104 parts of a light-yellow solution, which contains a fine dispersed yellow precipitate and which becomes solid at room temperature. The solution contains 772 g., that are 36.7 percent per weight of the acrylic octadecyl ester. In the cooled receiver there are obtained 274 g. nickel carbonyl.

What we claim is:

1. In a process for the production of acrylic compounds by the reaction of acetylene, carbon monoxide and a compound with a reactive hydrogen atom selected from the group consisting of saturated aliphatic alcohols containing 1 to 18 carbon atoms, organic primary and secondary amines and water in an acid reaction medium, the improvement which comprises initiating said reaction with reactants consisting essentially of said compound with a reactive hydrogen atom, acid, nickel carbonyl and a gaseous mixture of acetylene and carbon monoxide in a volumetric ratio of acetylene to carbon monoxide of from 20:80 to 90.10, at normal pressure up to a pressure of 10 atmospheres and at a temperature between 70° C. and 200° C., and continuing said reaction in the presence of nickel carbonyl and within the foregoing range of the volumetric ratio of acetylene to carbon monoxide temperature and pressure.

2. In a process for the production of acrylic compounds by the reaction of acetylene, carbon monoxide and a compound with a reactive hydrogen atom selected from the group consisting of saturated aliphatic alcohols containing 1 to 18 carbon atoms, organic primary and secondary amines and water in an acid reaction medium, the improvement which comprises initiating said reaction with reactants consisting essentially of said compound with a reactive hydrogen atom, acid, nickel carbonyl and a gaseous mixture of acetylene and carbon monoxide in a volumetric ratio of acetylene to carbon monoxide of from 20:80 to 90:10, at normal pressure up to a pressure of 10 atmospheres and at a temperature between 75° C. and 120° C., and continuing said reaction in the presence of nickel carbonyl and within the foregoing range of the volumetric ratio of acetylene to carbon monoxide temperature and pressure.

3. In a process for the production of acrylic esters by the reaction of acetylene, carbon monoxide and an alcohol selected from the group consisting of aliphatic and cyclo-aliphatic alcohols with 1 to 18 carbon atoms in an acid reaction medium, the improvement which comprises initiating said reaction with reactants consisting essentially of said alcohol, acid, nickel carbonyl and a gaseous mixture of acetylene and carbon monoxide in a volumetric ratio of acetylene to carbon monoxide of from 20:80 to 90:10, at normal pressure up to a pressure of 10 atmospheres and at a temperature between 75° C. and 120° C., and continuing said reaction in the presence of nickel carbonyl and within the foregoing range of the volumetric ratio of acetylene to carbon monoxide temperature and pressure.

4. In a process for the production of acrylic esters by the reaction of acetylene, carbon monoxide and a saturated monohydric aliphatic alcohol containing 1 to 18 carbon atoms in an acid reaction medium, the improvement which comprises initiating said reaction with reactants consisting essentially of said alcohol, acid, nickel carbonyl and a gaseous mixture of acetylene and carbon monoxide in a volumetric ratio of acetylene to carbon monoxide of from 20:80 to 90:10, at normal pressure up to a pressure of 10 atmospheres and at a temperature between 75° C. and 120° C., and continuing said reaction in the presence of nickel carbonyl and within the foregoing range of the volumetric ratio of acetylene to carbon monoxide temperature and pressure.

5. In a process for the production of acrylic esters by the reaction of acetylene, carbon monoxide and an aliphatic polyhydric alcohol in an acid reaction medium, the improvement which comprises initiating said reaction with reactants consisting essentially of said alcohol, acid, nickel carbonyl and a gaseous mixture of acetylene and carbon monoxide in a volumetric ratio of acetylene to carbon monoxide of from 20:80 to 90:10, at normal pressure up to a pressure of 10 atmospheres and at a temperature between 75° C. and 120° C., and continuing said reaction in the presence of nickel carbonyl and within the foregoing range of the volumetric ratio of acetylene to carbon monoxide temperature and pressure.

6. A process for the production of n-butyl acrylate by the reaction of acetylene, carbon monoxide and n-butanol in the presence of nickel carbonyl and hydrogen chloride, which process comprises initiating said reaction with reactants consisting essentially of n-butanol, hydrogen chloride, nickel carbonyl and a gaseous mixture of acetylene and carbon monoxide in a volumetric ratio of acetylene to carbon monoxide of from 20:80 to 90:10, at normal pressure and at a temperature between 85° C. and 90° C., and continuing said reaction in the presence of nickel carbonyl and within the foregoing range of the volumetric ratio of acetylene to carbon monoxide temperature and pressure.

7. A process as claimed in claim 6 wherein acrylic acid is substituted for the hydrogen chloride.

8. A process for the production of ethyl acrylate by the reaction of acetylene, carbon monoxide and ethyl alcohol in the presence of nickel carbonyl and hydrogen chloride, which process comprises initiating said reaction with reactants consisting essentially of ethyl alcohol, hydrogen chloride, nickel carbonyl and a gaseous mixture of acetylene and carbon monoxide in a volumetric ratio of acetylene to carbon monoxide of from 20:80 to 90:10, at normal pressure and at a temperature between 75° C. and 80° C., and continuing said reaction in the presence of nickel carbonyl and within the foregoing range of the volumetric ratio of acetylene to carbon monoxide temperature and pressure.

9. A process for the production of cyclohexyl acrylate by the reaction of acetylene, carbon monoxide and cyclohexanol in the presence of nickel carbonyl and hydrogen chloride, which process comprises initiating said reaction with reactants consisting essentially of cyclohexanol, hydrogen chloride, nickel carbonyl and a gaseous mixture of acetylene and carbon monoxide in a volumetric ratio of acetylene to carbon monoxide of from 20:80 to 90:10, at normal pressure and at a temperature between 90° C. and 100° C., and continuing said reaction in the presence of nickel carbonyl and within the foregoing range of the volumetric ratio of acetylene to carbon monoxide temperature and pressure.

10. A process for the production of n-dodecylacrylate by the reaction of acetylene, carbon monoxide and n-dodecylalcohol in the presence of nickel carbonyl and said reaction with reactants consisting essentially of n-dodecylalcohol, hydrogen chloride, nickel carbonyl and a gaseous mixture of acetylene and carbon monoxide in a volumetric ratio of acetylene to carbon monoxide of from 20:80 to 90:10, at normal pressure and at a temperature between 80° C. and 90° C., and continuing said reaction in the presence of nickel carbonyl and within the foregoing range of the volumetric ratio of acetylene to carbon monoxide temperature and pressure.

11. A process for the production of n-octadecylacrylate by the reaction of acetylene, carbon monoxide and n-octadecylalcohol in the presence of nickel carbonyl and hydrogen chloride, which process comprises initiating said reaction with reactants consisting essentially of n-octadecylalcohol, hydrogen chloride, nickel carbonyl and a gaseous mixture of acetylene and carbon monoxide in a volumetric ratio of acetylene to carbon monoxide of from 20:80 to 90:10, at normal pressure and at a temperature between 85° C. and 95° C., and continuing said reaction in the presence of nickel carbonyl and within the foregoing range of the volumetric ratio of acetylene to carbon monoxide temperature and pressure.

12. A process for the production of the monoacrylic acid ester of butanediol-(1,4) by the reaction of acetylene, carbon monoxide and butanediol-(1,4) in the presence of nickel carbonyl and hydrogen chloride, which process comprises initiating said reaction with reactants consisting essentially of butanediol-(1,4), hydrogen chloride, nickel carbonyl and a gaseous mixture of acetylene and carbon monoxide in a volumetric ratio of acetylene to carbon monoxide of from 20:80 to 90:10, at normal pressure and at a temperature between 80° C. and 95° C., and continuing said reaction in the presence of nickel carbonyl and within the foregoing range of the volumetric ratio of acetylene to carbon monoxide temperature and pressure.

13. A process for the production of acrylic acid by the reaction of acetylene, carbon monoxide and water in the presence of nickel carbonyl and hydrogen chloride, which process comprises initiating said reaction with reactants consisting essentially of water, hydrogen chloride, nickel carbonyl and a gaseous mixture of acetylene and carbon monoxide in a volumetric ratio of acetylene to carbon monoxide of from 20:80 to 90:10, at normal pressure and at a temperature between 80° C. and 90° C., and continuing said reaction in the presence of nickel carbonyl and within the foregoing range of the volumetric ratio of acetylene to carbon monoxide temperature and pressure.

14. In a process for the production of N-substituted acrylamides by the reaction of acetylene, carbon monoxide and an organic secondary amine in an acid reaction medium, the improvement which comprises initiating said reaction with reactants consisting essentially of said secondary amine, acid, nickel carbonyl and a gaseous mixture of acetylene and carbon monoxide in a volumetric ratio of acetylene to carbon monoxide of from 20:80 to 90:10, at normal pressure up to a pressure of 10 atmospheres and at a temperature between 75° C. and 120° C., and continuing said reaction in the presence of nickel carbonyl and within the foregoing range of the volumetric ratio of acetylene to carbon monoxide temperature and pressure.

15. A process for the production of acrylic acid-N-methylanilide by the reaction of acetylene, carbon monoxide and N-methylaniline in the presence of nickel carbonyl and acrylic acid, which process comprises initiating said reaction with reactants consisting essentially of N-methylaniline, acrylic acid, nickel carbonyl and a gaseous mixture of acetylene and carbon monoxide in a volumetric ratio of acetylene to carbon monoxide of from 20:80 to 90:10, in the presence of methyl ethyl ketone as an inert solvent, at normal pressure and at a temperature between 75° C. and 80° C., and continuing said reaction in the presence of nickel carbonyl and within the foregoing range of the volumetric ratio of acetylene to carbon monoxide temperature and pressure.

References Cited in the file of this patent

UNITED STATES PATENTS

| | | |
|---|---|---|
| 2,582,911 | Neher et al. | Jan. 15, 1952 |
| 2,599,424 | Albrecht et al. | June 3, 1952 |
| 2,613,222 | Specht et al. | Oct. 7, 1952 |
| 2,773,063 | Specht et al. | Dec. 4, 1956 |
| 2,778,848 | Neuman et al. | Jan. 22, 1957 |
| 2,881,205 | Lakli et al. | Apr. 7, 1959 |

FOREIGN PATENTS

| | | |
|---|---|---|
| 1,113,018 | France | Nov. 23, 1955 |

OTHER REFERENCES

Modern Plastics, vol. 23, pp. 162–163 and 210, Nov. 1945.

UNITED STATES PATENT OFFICE
CERTIFICATE OF CORRECTION

Patent No. 3,009,948                        November 21, 1961

Hans Lautenschlager et al.

It is hereby certified that error appears in the above numbered patent requiring correction and that the said Letters Patent should read as corrected below.

Column 1, line 13, after "and" insert -- a --; column 2, line 66, for "on" read -- one --; column 5, between lines 52 and 53, insert "Example 9", in italics, as a centered heading; column 6, line 24, for "90.10" read -- 90:10 --; column 7, line 57, after "and" insert -- hydrogen chloride, which process comprises initiating --; column 8, line 14, for "80° C." read -- 85° C. --; line 67, for "lakli" read -- Dakli --.

Signed and sealed this 8th day of May 1962

(SEAL)
Attest:

ERNEST W. SWIDER
Attesting Officer

DAVID L. LADD
Commissioner of Patents